March 26, 1940.    C. A. LILLEY    2,194,461
ASSIST CORD FASTENING
Filed May 5, 1937
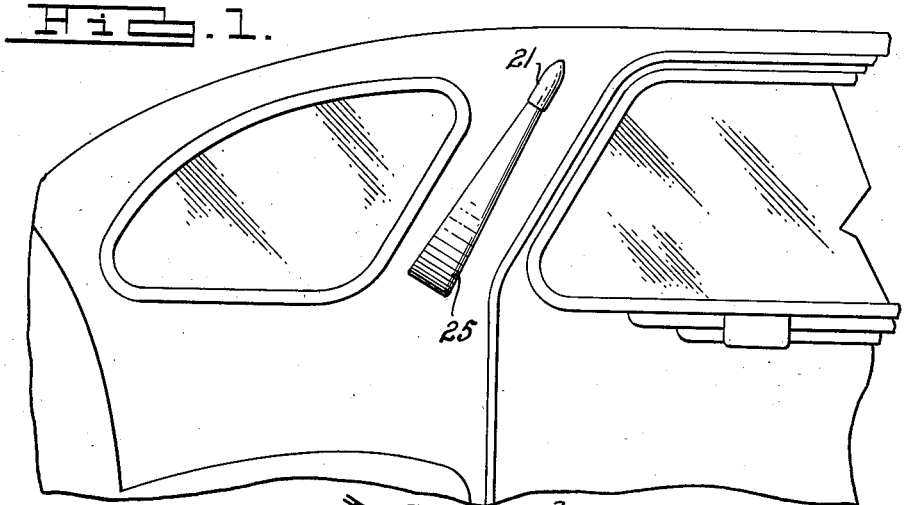
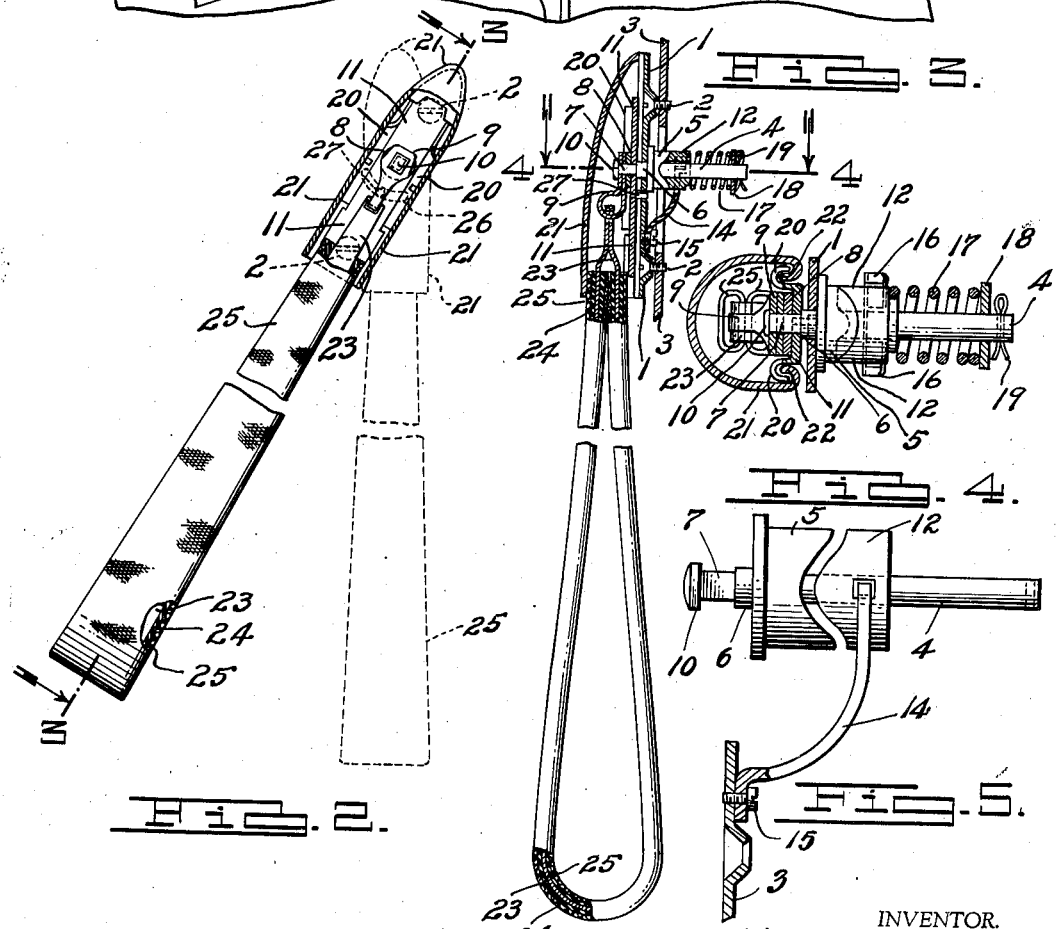
INVENTOR.
Clifford A. Lilley
BY
Emmett B. Wisner
ATTORNEY.

Patented Mar. 26, 1940

2,194,461

UNITED STATES PATENT OFFICE 2,194,461

ASSIST CORD FASTENING

Clifford A. Lilley, Detroit, Mich.

Application May 5, 1937, Serial No. 140,951

5 Claims. (Cl. 105—354)

The invention relates to assist cord fastenings and the object of the invention is to provide a fastening for an assist cord in an automobile whereby the assist cord is yieldably held in a position parallel with the body pillar on which it is mounted and which may be turned out of position in use but will automatically return to position when released.

Another object of the invention is to provide a fastening of the character described comprising a fixed base plate and a turnable member mounted on the base plate, the assist cord being fastened to the turnable member and the turnable member being provided with a cover normally concealing the fastening and base plate.

A further object of the invention is to provide a pair of inter-engaging cam members in which one cam member is secured to the base plate and the other cam member is arranged to turn with the turnable member and spring means are provided urging the cam members into engagement.

Another object of the invention is to provide an assist cord fastening having inter-engaging cam members and spring means urging the cam members into engagement, the said cam members normally holding the fastening and assist cord in a predetermined position and the fastening and assist cord being turnable against the action of the cams out of normal position and the spring means and cams tending to return the assist cord to normal position when released.

These objects and the several novel features of the invention are hereinafter more fully described and claimed and the preferred form of construction by which these objects are attained is shown in the accompanying drawing in which—

Fig. 1 is a view of automobile body interior with the assist cord mounted in position on a sloping body pillar.

Fig. 2 is an enlarged view of the assist cord with the cover member in section to show the fastening.

Fig. 3 is a slightly enlarged section taken on line 3—3 of Fig. 2.

Fig. 4 is an enlarged section taken on line 4—4 of Fig. 3.

Fig. 5 is an enlarged view of the two cams separated slightly to show their contacting faces.

The device comprises a base plate 1, shown more particularly in Figs. 3 and 4, and provided with a pair of screws 2 for mounting the device in position. These screws 2 in a metal body construction will be secured to a metal frame member 3 and in a wood body construction these screws 2 will be wood screws threaded into the pillar posts. Rotatably mounted in the base plate 1 is a shaft 4 having a cam 5 thereon which engages against the base plate 1 and this shaft 4 is provided with a cylindrical portion 6 extending through the plate 1 and a square end 7 extending through the turnable plate 11, washer 8 and ends of the link 9. The extreme upper end of the square portion 7 is headed over at 10 so that the turnable plate 11, washer 8 and link ends 9 are secured to turn with the shaft 4. A stationary cam 12 is fitted over the shaft 4 and is provided with cam faces fitting the cam faces of the cam 5 as will be understood from Figs. 3 and 4. An arm 14 is attached to the base plate 1 by the screw 15 and the ends 16 of the arm 14 are anchored in the cam 12 to hold this cam from turning movement with the cam 5. A coiled spring 17 is positioned about the shaft 4 between the cam 12 and the washer 18 and the washer 18 is held in position by a cotter key 19 extending through an aperture provided therefor in the end of the shaft 4.

The turnable plate 11, as shown in Fig. 4, is provided with return bent side flanges 20 and a cover 21 is provided having side flanges 22 inter-engaging with the side flanges 20 of the turnable plate to conceal the fastening from view.

The assist cord is attached to the link 9 which is secured to the square end 7 of the shaft 4. The assist cord is provided with a spring metal core having ends 23 provided with apertures through which the link 9 extends. This metal core is covered with a sponge rubber or other suitable cover 24 over which a fabric cover 25 is secured, as will be understood from Figs. 2 and 3.

This assist cord fastening is particularly designed for use with late model automobile bodies in which the rear pillar post extends at an angle to the vertical as will be understood from Fig. 1. In this case it is desired to have the assist cord normally remain in the angular position shown in Fig. 1 parallel with the body pillar. When this body pillar is wood it is recessed to receive the extending end of the shaft 4 and parts thereon and when the pillar is of metal construction an opening is formed in the metal 3, as shown in Fig. 3, to receive the extending end of the shaft 4 and parts thereon. When mounted in position the cams 5 and 12 inter-engage, as shown in Figs. 3 and 4, to hold the assist cord in the position shown in Figs. 1 and 2. Should a person take hold of the assist cord the assist cord can turn and will turn the shaft 4 and cam 5 with the turnable plate 11 and handle of the assist cord. As the cam 5 is turned it will cam the cam 12 to the right of Figs. 3 and 4 against the tension of the spring 17 and the arm 14 will allow such movement of the cam 12.

It is also to be noted at this time that the cover 21 will turn with the turnable plate 11 and with the assist cord and upon release the cam 12, under action by the spring 17, will be forced into the cam 5 thus turning the cam 5 back to normal position and will thus turn the assist cord and plate 11 and cover 21 back to the position shown in Fig. 1.

In order to limit turning movement of the assist cord the base plate 1 is provided with an arcuate slot 26 and the turnable plate 11 is provided with a pin 27 riding in this slot, as will be understood from Figs. 2 and 3, and the pin 27 extending into the slot 26 thus limits turning movement of the assist cord in either direction. The cover 21 may be slipped onto or off from the turnable plate 11 and provides a neat finished appearance which conceals the fastening and base plate when in the normal position shown in Figs. 1 and 2.

From the foregoing description it becomes evident that the device is very simple and efficient in operation, will not easily get out of order, will automatically return the assist cord to the normal position when released and provides a device which accomplishes the objects described.

Having thus fully described my invention, its utility and mode of operation, what I claim and desire to secure by Letters Patent of the United States is:

1. In an assist cord mounting, a base plate, a turnable plate mounted for limited turning movement on the base plate, an assist cord mounted to turn with the turnable plate, spring operated means urging the turnable plate to a neutral position intermediate the ends of its turning movement, a cover member detachably secured to the turnable plate and the turnable plate and cover member concealing the base plate from view when in the neutral position.

2. In an assist cord fastening, a stationary base plate, a stationary cam secured to the base plate and having a pair of diametrically opposite high points on the face, a turnable cam mounted to turn relative to the base plate and having a pair of diametrically opposite high points on the face normally engaging between the high points on the stationary cam, a spring urging the cam faces into engagement, the arrangement being such that as the turnable cam is turned one-fourth of a turn in either direction its high points engage the high points on the stationary cam and force the stationary cam outwardly against the tension of the spring, a plate connected to the turnable cam, a pin carried by the said plate, the stationary base plate being provided with a slot arranged to receive said pin and limit turning movement of the turnable plate in relation to the base plate, an assist cord mounted to turn with the turnable plate, said cams and spring means normally maintaining the turnable plate with the pin of the turnable plate intermediate the ends of the slot of the base plate, said spring means and cams yieldably resisting turning movement of the turnable plate and turnable cam in either direction.

3. In an assist cord fastening, a stationary base plate, a stationary cam secured to the base plate and having a pair of diametrically opposite high points, a turnable cam mounted to turn on the base plate and having a pair of diametrically opposite high points normally engaging between the high points on the stationary cam, a spring urging the cams into engagement, the arrangement being such that as the turnable cam is turned in either direction the high points of the turnable cam are moved into engagement with the high points of the stationary cam against the tension of the spring, a plate connected to the turnable cam, the plate being provided with side flanges, a flanged cover member adapted for sliding engagement with the side flanges of the turnable plate and an assist cord secured to turn with the turnable plate.

4. In an assist cord fastening, a stationary base plate, a stationary cam having a pair of diametrically opposite high points, a turnable cam mounted to turn relative to the base plate and having a pair of diametrically opposite high points on the face normally engaging between the high points on the stationary cam, a spring urging the stationary cam into engagement with the movable cam, the arrangement being such that as the turnable cam is turned in either direction the high points of the turnable cam are moved into engagement with the high points of the stationary cam to move the stationary cam against the tension of the spring, a plate turnable with the movable cam, an assist cord mounted to turn with the turnable plate, the arrangement being such that turning movement of the turnable plate in either direction is yieldably resisted by the inter-engaging cams and spring tending to return the turnable plate to the original position.

5. In an assist cord fastening, a stationary base plate, a shaft rotatably mounted in the base plate, a cam turnable with the shaft and provided with a pair of diametrically opposite high points on the face, an assist cord attached to the shaft, a non-turnable cam having a pair of high points normally engaging between the high points of the turnable cam, spring means urging the cam faces into engagement, the arrangement being such that turning movement of the turnable cam in either direction is resisted by the sliding action of the cam faces against the tension of the spring.

CLIFFORD A. LILLEY.